US012658828B2

(12) United States Patent
Seo et al.

(10) Patent No.: US 12,658,828 B2
(45) Date of Patent: Jun. 16, 2026

(54) MOTOR DRIVING DEVICE AND BRAKING CONTROL METHOD PERFORMED BY THE SAME

(71) Applicant: LG Electronics Inc., Seoul (KR)

(72) Inventors: Bohwan Seo, Seoul (KR); Daejoong Kim, Seoul (KR); Daihyun Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 148 days.

(21) Appl. No.: 18/485,818

(22) Filed: Oct. 12, 2023

(65) Prior Publication Data

US 2024/0204700 A1 Jun. 20, 2024

(30) Foreign Application Priority Data

Dec. 14, 2022 (KR) ........................ 10-2022-0175143

(51) Int. Cl.

| | |
|---|---|
| ***H02P 3/22*** | (2006.01) |
| ***D06F 33/46*** | (2020.01) |
| ***D06F 33/47*** | (2020.01) |
| ***D06F 34/08*** | (2020.01) |
| ***D06F 39/30*** | (2024.01) |

(Continued)

(52) U.S. Cl.

CPC ................ *H02P 3/22* (2013.01); *D06F 33/46* (2020.02); *D06F 33/47* (2020.02); *D06F 34/08* (2020.02); *D06F 39/30* (2024.01); *H02K 11/33* (2016.01); *H02M 1/0009* (2021.05); *H02P 27/085* (2013.01); *D06F 2103/46* (2020.02); *H02P 2201/13* (2013.01)

(58) Field of Classification Search

CPC .... H02P 29/0241; H02P 27/08; H02P 27/085; H02P 3/22; H02P 3/18; D06F 33/46; D06F 33/47; D06F 34/08; D06F 39/30; H02K 11/33; H02M 1/0009

See application file for complete search history.

(56) References Cited

FOREIGN PATENT DOCUMENTS

| | | | | |
|---|---|---|---|---|
| CN | 108039730 | | 5/2018 | |
| CN | 108039730 A | * | 5/2018 | ............ H02J 3/1857 |

(Continued)

OTHER PUBLICATIONS

Extended European Search Report in European Appln. No. 23202299.6, mailed on Apr. 12, 2024, 9 pages.

*Primary Examiner* — Said Bouziane
(74) *Attorney, Agent, or Firm* — Fish & Richardson P.C.

(57) ABSTRACT

A motor driving device includes a direct current (DC) link capacitor configured to store DC power, and an inverter configured to convert the DC power stored in the DC link capacitor into AC power and supply the AC power to a motor. The motor driving device includes a shunt resistor configured to sense current flowing through the inverter and detect whether the current has reached threshold current for controlling a regenerative voltage during a braking operation. A control unit is configured to control an operation of the inverter and perform a regenerative operation when the braking operation is started. The control unit, during the regenerative operation, switches motive power of a drum connected to the motor into regenerative energy and transmit the regenerative energy to the DC link capacitor, by controlling active component current and reactive component current together in response to the reaching of the threshold current.

17 Claims, 7 Drawing Sheets

(51) Int. Cl.

| | |
|---|---|
| ***D06F 103/46*** | (2020.01) |
| ***H02K 11/33*** | (2016.01) |
| ***H02M 1/00*** | (2007.01) |
| ***H02P 27/08*** | (2006.01) |

(56) References Cited

FOREIGN PATENT DOCUMENTS

| | | | | | |
|---|---|---|---|---|---|
| EP | 2982844 | | | 11/2018 | |
| EP | 3429047 | | | 1/2019 | |
| EP | 3611837 | | | 2/2020 | |
| EP | 3920410 | | | 12/2021 | |
| JP | 2014-168575 | | | 9/2014 | |
| KR | 10-1995-0014431 | | | 6/1995 | |
| KR | 10-2001-0036937 | A | | 5/2001 | |
| KR | 20120059335 | A | * | 6/2012 | .............. H02M 1/32 |
| KR | 10-2015-0129046 | A | | 11/2015 | |
| KR | 10-2019-0063252 | A | | 6/2019 | |

* cited by examiner

MOTOR DRIVING DEVICE AND BRAKING CONTROL METHOD PERFORMED BY THE SAME

CROSS-REFERENCE TO RELATED APPLICATION

Pursuant to 35 U.S.C. § 119(a), this application claims the benefit of the earlier filing date and the right of priority to Korean Patent Application No. 10-2022-0175143, filed on Dec. 14, 2022, the contents of which are incorporated by reference herein in their entirety.

TECHNICAL FIELD

This disclosure relates to a motor driving device, a braking control method performed by the same, and a home appliance including the same, and more particularly, to braking control that may be applied when stop occurs during a high-speed operation.

BACKGROUND

A motor driving device is a device configured to drive a motor including a rotor configured to perform a rotation motion and a stator wound with a coil.

The motor driving device may be classified into a sensor-type motor driving device using a sensor and a sensorless-type motor driving device that does not include a sensor.

Among these types of motor driving devices, the sensorless-type motor driving device is frequently used for reasons such as a manufacture cost reduction, etc., and accordingly, researches on the sensorless-type motor driving device are being conducted to achieve effective motor driving.

Various technical changes in a washing machine are being made due to user's demands such as rapid strokes and improved performance.

For example, even though braking control needs to be essentially applied to a washing machine, when generative braking used for an existing home washing machine is identically applied to a commercial washing machine having a great load and inertia of a drum, motor demagnetization and an inverter damage may occur.

Related art discloses that, when quick braking is needed, regenerative braking for discharging regenerative energy to a capacitor is performed in a case of a set speed or higher, and regenerative braking is performed at limit current or greater in a case of a speed less than the set speed. However, the related art has a problem such that when a regenerative braking method using regenerative resistance is applied to a commercial appliance such as a commercial washing machine, etc., a braking resistor with a very large capacity is needed. This may increase a product cost of the commercial appliance and cause a reliability problem.

In addition, other related art discloses a regenerative control method performed by simultaneously turning three upper or lower switches of an inverter on to thereby dissipate energy. However, when the method disclosed in the related art is applied to a commercial appliance such as a commercial washing machine having a motor with a small impedance, output current of an inverter greatly increases, thereby causing a damage. In addition, overcurrent occurs in the inverter, a motor may be demagnetized, thus damaging the inverter.

A washing machine is described as an example to explain such problems in detail. However, these problems are also applied commonly to other appliances including a motor and performing sudden braking and braking control using the motor.

SUMMARY

Therefore, an aspect of the present disclosure is to provide a motor driving device capable of, upon braking during a high-speed operation, effectively minimizing demagnetization of an inverter which may be caused by generation of overcurrent in the inverter, motor demagnetization, and noise generation, and a braking control method performed by the motor driving device.

In addition, an aspect of the present disclosure is to provide a motor driving device capable of, upon braking during a high-speed operation, effectively reducing braking time without generation of overcurrent, and a braking control method performed by the motor driving device.

In addition, an aspect of the present disclosure is to provide a motor driving device capable of, upon occurrence of a problem during a braking operation, performing braking by switching to another method and even detecting stop of a motor, and a braking control method performed by the motor driving device.

According to some embodiments of the present disclosure, a motor driving device may, upon generative braking during a high-speed operation of a motor, perform regenerative voltage control by additionally injecting reactive component current together with active component current. Accordingly, even when generative braking occurs during a high-speed operation, an inverter damage may be prevented and braking time may be effectively reduced.

In detail, a motor driving device according to an embodiment of the present disclosure may include: a direct current (DC) link capacitor configured to store DC power; an inverter including a plurality of upper switches and a plurality of lower switches, and configured to convert the DC power stored in the DC link capacitor into AC power according to a switching operation and supply the AC power to a motor; a shunt resistor connected to the plurality of lower switches, and configured to sense current flowing through the inverter and detect whether the current has reached threshold current for controlling a regenerative voltage during a braking operation; and a control unit configured to control an operation of the inverter and perform a regenerative operation when the braking operation is started. In addition, the control unit, during the regenerative operation, may control the inverter and the motor to switch motive power of a drum connected to the motor into regenerative energy and transmit the regenerative energy to the DC link capacitor, by controlling active component current and reactive component current together in response to the reaching of the threshold current.

In an embodiment, the control unit may perform a first regenerative operation of transmitting, to the DC link capacitor, regenerative energy generated by additionally injecting the reactive component current when the threshold current is reached, and a second regenerative operation of transmitting, to the DC link capacitor, regenerative energy generated by maintaining or reducing the reactive component current when the current is less than the threshold current.

In an embodiment, a load connected to the motor may be a drum, and the control unit may perform the regenerative operation by starting the braking operation in response to occurrence of stop during a high-speed operation of the drum.

In an embodiment, the control unit, in response to occurrence of a control problem while the regenerative operation is performed, may perform variable duty control of turning the plurality of lower switches at a certain time interval to maintain a voltage of the DC link capacitor to be constant.

In an embodiment, the motor driving device may further include a small-capacity regenerative resistor having one end connected to the inverter and another end connected to the DC link capacitor.

In an embodiment, the control unit, in response to occurrence of a control problem while the regenerative operation is performed, may additionally perform a chopper operation by the small-capacity regenerative resistor together with the variable duty control.

In an embodiment, the variable duty control, or the variable duty control and the chopper operation may be maintained until the motor stops.

In addition, according to an embodiment of the present disclosure, a braking control method performed by a motor driving device including a direct current (DC) link capacitor configured to store DC power, an inverter including a plurality of upper switches and a plurality of lower switches and configured to convert the DC power stored in the DC link capacitor into AC power according to a switching operation and supply the AC power to a motor, a shunt resistor connected to the plurality of lower switches and configured to sense current flowing through the inverter and detect whether the current has reached threshold current for controlling a regenerative voltage during a braking operation; and a control unit, the braking control method including: generating a control command for starting generative braking to stop the motor; detecting, via the shunt resistor, that the current flowing through the inverter reaches the threshold current; and performing a regenerative operation of switching motive power of a drum connected to the motor into regenerative energy by controlling active component current and reactive component current together in response to the reaching of the threshold current, and transmitting the regenerative energy to DC link capacitor.

According to an embodiment, the performing of the regenerative operation may include: performing a first regenerative operation of transmitting, to the DC link capacitor, regenerative energy generated by additionally injecting the reactive component current when the threshold current is reached, and performing a second regenerative operation of transmitting, to the DC link capacitor, regenerative energy generated by maintaining or reducing the reactive component current generated when the current is less than the threshold current.

According to an embodiment, the generative braking may be performed in response to occurrence of stop during a high-speed operation with respect to a load connected to the motor.

According to an embodiment, the braking control method may further include: detecting occurrence of a control problem while the regenerative operation is performed; and performing variable duty control of simultaneously turning the plurality of lower switches on or off at a certain time interval to maintain a voltage of the DC link capacitor to be constant.

According to an embodiment, the braking control method may further include, while the variable duty control is performed, additionally performing a chopper operation by a small-capacity regenerative resistor having one end connected to the inverter and another end connected to the DC link capacitor.

According to an embodiment, the braking control method may further include continuously performing the variable duty control and the chopper operation until the motor stop.

Effects of a motor driving device and terminal and a braking control method performed by the same according to this disclosure will be described as follows.

According to at least one of embodiments of this disclosure, upon occurrence of braking during a high-speed operation of a motor, a damage to an inverter which may be caused by occurrence of overcurrent may be prevented, and motor demagnetization and noise generation may be effectively minimized.

According to at least one of embodiments of this disclosure, upon occurrence of braking during a high-speed operation of a motor, regenerative voltage control may be performed by additionally injecting reactive component current to thereby reduce braking time.

According to at least one of embodiments of this disclosure, when occurrence of a control problem is detected while regenerative voltage control is performed, variable duty control for simultaneously turning lower switches of an inverter on/off may be performed, and when a regenerative resistor is present, a chopper operation may be performed through the regenerative resistor together with the variable duty control to thereby quickly and stably perform regenerative energy consumption.

DETAILED DESCRIPTION

Figure 1:
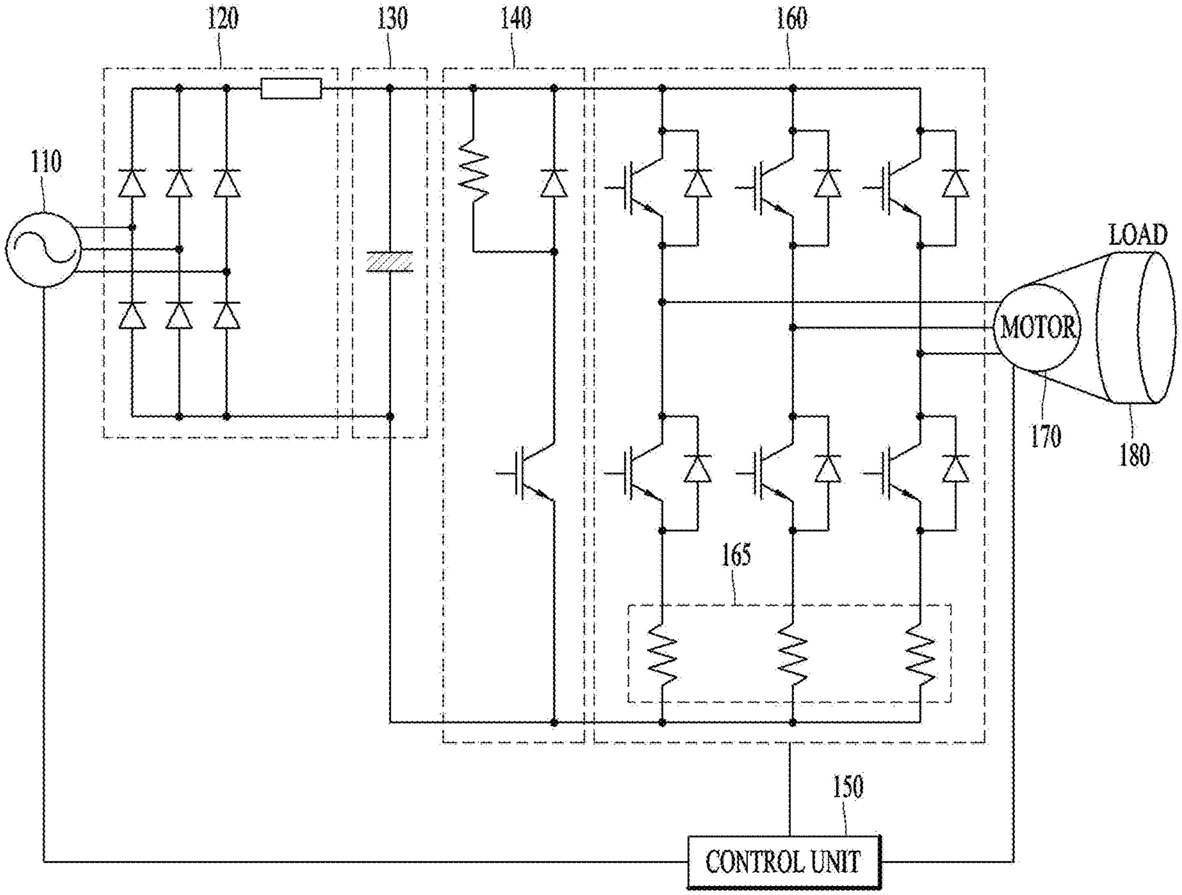
FIG. 1 is a circuit diagram for explaining a detailed configuration of a motor driving device according to this disclosure.

Hereinafter, the embodiments disclosed herein will be described in detail with reference to the accompanying drawings, and the same or similar elements are designated with the same numeral references regardless of the numerals in the drawings and their redundant description will be omitted. A suffix “module” and “unit” used for constituent elements disclosed in the following description is merely intended for easy description of the specification, and the suffix itself does not give any special meaning or function. In describing the embodiments disclosed herein, moreover, the detailed description will be omitted when specific description for publicly known technologies to which the disclosure pertains is judged to obscure the gist of the present disclosure. Also, it should be understood that the accompanying drawings are merely illustrated to easily explain the concept of the disclosure, and therefore, they should not be construed to limit the technological concept disclosed herein by the accompanying drawings, and the concept of the present disclosure should be construed as being extended to all modifications, equivalents, and substitutes included in the concept and technological scope of the disclosure.

FIG. 1 is a circuit diagram for explaining a detailed configuration of a motor driving device according to this disclosure. In addition, FIGS. 2A and 2B are diagrams for explaining generation of overcurrent during braking of an appliance to which a general motor driving device is applied.

Figure 2A:
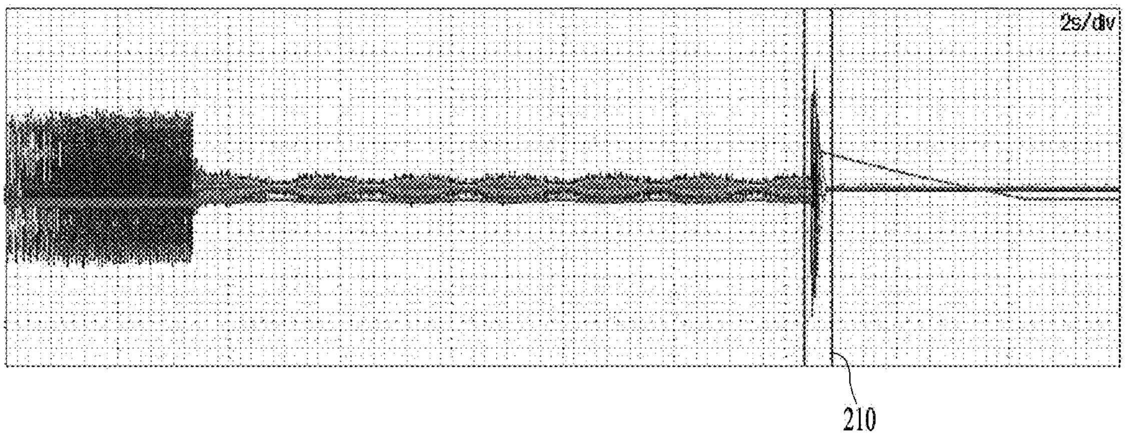
FIGS. 2A and 2B are diagrams for explaining generation of overcurrent during braking of an appliance to which a general motor driving device is applied.
Figure 2B:
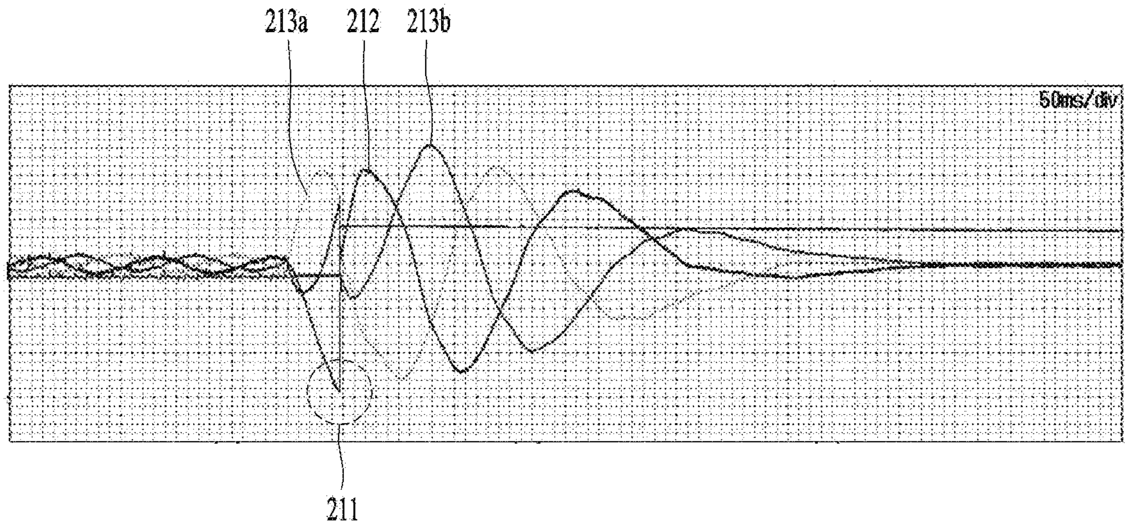

FIGS. 2A and 2B show experimental waveforms showing current when generative braking occurs during a low-speed operation of, for example, a commercial appliance having great inertia and load. FIG. 2B illustrates a waveform obtained by enlarging a section 210 of FIG. 2A in detail.

The section 210 corresponds to time in which generative braking is temporarily stopped, and then, resumed at a S/W fault detection level that is set so that an inverter damage and motor demagnetization do not occur. FIG. 2B shows an enlarged view of the section 210 in which q-axis current 211 greatly changes and both current and DC link voltages 212, 213*a*, and 213*b* increase when braking stops.

Particularly, since a load in a commercial appliance is excessively large, such large overcurrent occurs at a low speed, as well as at a high speed. Accordingly, when generative braking is applied during a high-speed operation, overcurrent occurs for a longer period of time, thus causing an inverter damage and motor demagnetization.

Thus, when lower switches at the inverter are turned on simultaneously with generative braking, overcurrent may occur, thereby causing demagnetization of a motor and a damage to an inverter. In addition, when regenerative braking control using resistance is used, a braking resistor with an excessively large capacity may need to be used. This may increase a material cost of the commercial appliance and deteriorate reliability.

Thus, in a motor driving device according to this disclosure and an appliance to which the motor driving device is applied, braking control that may be applied without using an additional part, upon stop during a high-speed operation (e.g., dehydration of a washing machine), is implemented.

In detail, with respect to the motor driving device according to this disclosure, a method of increasing a braking effect by performing regenerative voltage control by controlling reactive component current together with active component current, e.g., additionally injecting, maintaining, or gradually decreasing reactive component current is proposed.

In addition, a method of, when occurrence of a control problem is detected during braking control, performing another switching method capable of quickly and stably consuming regenerative energy, according to presence of a regenerative resistor, together with variable duty control is proposed.

Embodiments of this disclosure described hereinafter relate to a motor driving device, a braking control method performed by the same, and a home appliance including the same, and more particularly, to braking control that may be applied when stop occurs during a high-speed operation.

Hereinafter, referring to FIG. 1, functions or operations of a detailed configuration of the motor driving device will be described. A motor driving device 100 according to an embodiment of this disclosure may include a power unit 110, a rectifying portion 120. a direct current (DC) link capacitor 130, a control unit 150, an inverter 160, a motor 170, and a load 180.

The power unit 110 receives input power (commercial power/alternative current (AC) power) and transmit the received input power to the rectifying portion 120.

The rectifying portion 120 rectifies the input power supplied from the power unit 110 to convert the input power into a form of DC voltage. Accordingly, the rectifying portion 120 may output a constant level of DC voltage. Both ends of the rectifying portion 120 are connected to the DC link capacitor 130, and a reactor (a rectangle inside the rectifying portion 120) configured to enhance a power factor may be further included at one end of the rectifying portion 120.

The reactor (the rectangle inside the rectifying portion 120) may be configured as an inductor, and prevent inrush current that may be output to the rectifying portion 120 and/or the DC link capacitor 130.

The DC link capacitor 130 may smooth and store the DC voltage (DC power) output from the rectifying portion 120. The DC link capacitor 130 transmits the smoothed DC voltage to the inverter 160.

The inverter 160 may include a plurality of switches. The inverter 160 may include a pair of switches corresponding to each phase of a three-phase motor. For example, as illustrated in FIG. 1, when the motor 170 has three phases, the inverter 160 may include six switches S1 to S6, i.e., upper and lower switches corresponding to respective phases (d-phase, q-phase, w-phase). For example, a metal-oxide-semiconductor field-effect transistor (MOSFET), an insulated gate bipolar transistor (IGBT), etc. are mainly used as switches.

Referring to FIG. 1, the upper switches S1, S2, and S3 of the inverter 160 (other than a regenerative resistor and chopper circuit 140) are connected to one end of the DC link capacitor 130, and the lower switches S4, S5, and S6 of the inverter 160 are connected to another end of the DC link capacitor 130.

According switching operations of the upper and lower switches S1 to S6, the inverter 160 converts the DC power stored in the DC link capacitor 130 into AC power and supplies a result of the converting, i.e., the AC power to the motor 170.

A shunt resistor 165 may be disposed between the inverter 160 and the DC link capacitor 130. The shunt resistor 165 may detect phase current of the motor 170.

The shunt resistor 165 may detect current flowing through the inverter 160 and current flowing through the DC link capacitor 130, and detect whether threshold current for controlling a regenerative voltage is reached during a braking operation.

Here, the regenerative voltage control means control an operation of converting direct current with a voltage generated due to regenerative braking into direct current with a particular (or a certain level of) voltage (e.g., by stepping down the voltage or consuming the direct current into heat energy). In this disclosure, regenerative voltage control by transmitting regenerative energy only using the inverter 160 may be performed without having to use an additional converter.

As illustrated in FIG. 1, the shunt resistor 165 may be, for example, a three-shunt resistor connected in series respectively to a plurality of the lower switches S4 to S6 of the inverter 160.

In some embodiments, the motor drive device 100 may be configured to include a separate current detector (not shown) configured to detect whether overcurrent/threshold current is reached, i.e., a current transformer (CT), etc.

The motor 170 may be a load, e.g., a motor configured to rotate a pulsator of a large-capacity home appliance (e.g., a commercial washing machine). The motor 170 may be a three-phase motor configured to rotate a drum in the commercial washing machine.

In some embodiments, the motor drive device 100 may further include the regenerative resistor and chopper circuit 140 between the DC link capacitor 130 and the inverter 160. In other words, the regenerative resistor and chopper circuit 140 of FIG. 1 may be selectively included.

The regenerative resistor and chopper circuit 140 may include a regenerative resistor and a chopper circuit which are connected to each other in parallel, and may use an IGBT having a simplified circuit as a main circuit element as illustrated in FIG. 1.

In some embodiments, a snubber circuit (not shown) configured to limit overcurrent in the IGBT constituting the regenerative resistor and chopper circuit 140 may be further included. In addition, although not illustrated, in preparation of occurrence of a short circuit in the chopper circuit, an emergency operation relay (not shown) may be further included so that the regenerative resistor is connected to a motor to consume regenerative energy.

According to an embodiment, a length of a space between the regenerative resistor and the chopper circuit in the regenerative resistor and chopper circuit 140 may be implemented to be small to reduce an inductance component.

The regenerative resistor may have one end connected to the inverter 160 (via the chopper circuit) and another end connected to the DC link capacitor 130. The regenerative resistor may be implemented as a small-capacity regenerative resistor regardless of a capacity of an appliance to which the motor drive device 100 is applied.

The control unit 150 may control operations of the power unit 110, the rectifying portion 120, the DC link capacitor 130, the inverter 160, and the motor 170. The control unit 150 may be also referred to as a Micom, a processor, a controller, etc., and implemented to include one or more Micoms, processors, or controllers. In addition, the control unit 150 may include a separate Micom, processor or controller configured to control respective detailed configurations of the motor drive device 100. For example, the inverter 160 may be controlled by an inverter control unit (or a Micom/processor/controller, etc. configured to control the inverter 160).

The control unit 150 may perform a regenerative operation in correspondence with reaching of threshold current.

In detail, when flow of maximum current through the motor 170 and/or the inverter 160 is detected during braking, the control unit 150 may additionally inject reactive component current to thereby control the maximum current to a constant level of voltage (e.g., 850 V). Accordingly, braking performance may be enhanced (e.g., reduction in braking time).

During the regenerative operation, the control unit 150 may control the inverter 160 and the motor 170 to switch motive power of a load connected to the motor 170 into regenerative energy and transmit the regenerative energy to a DC link capacitor, by controlling active component current and reactive component current together.

In this case, the load connected to the motor 170 may be a drum (e.g., a drum in a commercial washing machine). In addition, according to an embodiment, the control unit 150 may perform the regenerative operation by starting generative braking in response to occurrence of stop during a high-speed operation of the drum (e.g., dehydration).

According to an embodiment, when reaching of threshold current is detected during a braking operation, the control unit 150 performs a first regenerative operation of transmitting, to the DC link capacitor 130, regenerative energy generated by additionally injecting reactive component current.

According to an embodiment, when current less than threshold current is detected during a braking operation, the control unit 150 performs a second regenerative operation of transmitting, to the DC link capacitor 130, regenerative energy generated by maintaining or reducing reactive component current.

Figure 3:
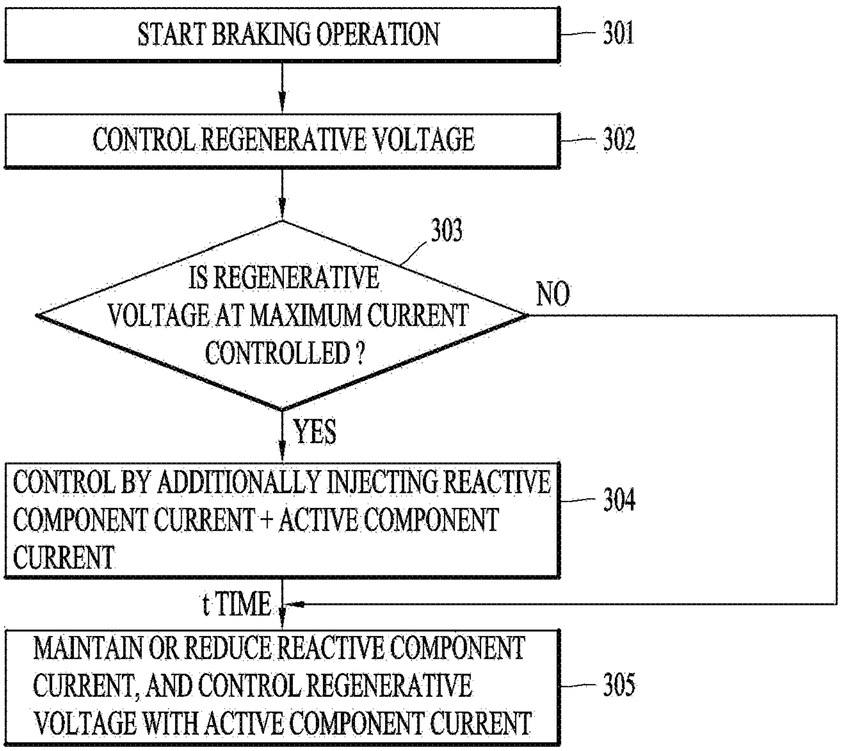
FIG. 3 is a flowchart for explaining a method of controlling a regenerative voltage according to an embodiment of this disclosure.

FIG. 3 is a flowchart for explaining a braking control method performed by a motor driving device, i.e., a method of controlling a regenerative voltage according to an embodiment of this disclosure. It is assumed that each operation shown in FIG. 3 is performed by a control unit included in the motor drive device, unless otherwise described.

Referring to FIG. 3, the control unit in the motor drive device starts a braking operation according to a stop signal during a high-speed operation (301). For example, like a case when a door of a washing machine is opened while a dehydration stroke is performed (i.e., during a high-speed operation), when a condition in which a sudden stop of a washing machine is needed is satisfied, the control unit 150 of FIG. 1 may generate a control command for a braking operation (or generative braking).

Then, the control unit 150 performs regenerative voltage control according to driving of the braking operation (302).

In detail, when the braking operation is started, the control unit 150 detects a rotation speed of the motor 170 (of FIG. 1) and compares the detected rotation speed with a value of a reference speed. When the detected rotation speed is equal to or greater than the reference speed, the control unit 150 may turn the lower switches S4, S5, and S6 of the inverter 160 full on, and turn the upper switches S1, S2, and S3 full off.

In this case, the reference speed value may be, for example, one among a value of 600 RPM, a user set value, and a value varying according to conditions (e.g., a weight of clothes introduced into a washing machine, a weight of washing water, a specification such as a capacity of the DC link capacitor, etc.). Then, when a certain time elapses, a duty ratio of the lower switches S4, S5, and S6 of the inverter 160 may be gradually (e.g., linearly) increased to perform the regenerative voltage control.

In some embodiments, before the regenerative voltage control described above is performed, 'force braking' of turning the upper switches S1, S2, and S3 and the lower switches S4, S5, and S6 of the inverter 160 all full off may be performed, and then, with respect to switching of the lower switches S4, S5, and S6 from a full-off state to a full-on state, 'intermediate braking' of gradually increasing a duty ratio of the lower switches S4, S5, and S6 may be implemented to be further performed.

In addition, the regenerative voltage control may mean, when a measured voltage is equal to or greater than a threshold voltage, performance of a regenerative operation according to control by the control unit.

In this case, regenerative power generated according to the regenerative voltage control is discharged at the DC link capacitor 130, or the DC link capacitor 130 and the regenerative resistor, and converted into heat energy to be thereby consumed.

Then, with respect to the regenerative voltage control, the control unit may determine whether control of the regenerative voltage at maximum current is needed (303), and according to the determining, perform the regenerative voltage control by variably applying control of reactive component current.

A case when the control of a regenerative voltage at maximum current is needed means a case when regenerative current (or regenerative power) reaches threshold current that is set. Whether the threshold current is reached may be detected through a shunt resistor or a separate current detector (not shown).

In detail, in operation 303, when it is determined that the control of a regenerative voltage at maximum current is needed, the control unit performs the regenerative voltage control by additionally injecting reactive component current to active component current (operation 304).

Here, the active component current may indicate a d-axis component of the motor 170, and the reactive component current may indicate a q-axis component of the motor 170. Here, a reference current value Iq_ref may be 0.

For example, in comparison with a reference voltage (corresponding to threshold current/maximum current), when the detected voltage is equal to or less than the reference voltage, a three-phase voltage and three-phase current of the motor may be detected and respectively dq-converted, and then, divided into an active component and a reactive component through a digital filter. On the other hand, in comparison with the reference voltage, when the detected voltage exceeds the reference voltage, an amount to be controlled is determined based on a voltage error according to the comparison therebetween, and based on the amount to be controlled, (converted) d-axis current and q-axis current in correspondence with a value of active component current to be compensated for, in other words, active component current to be controlled and reactive component current to be additionally injected are calculated.

The active component current and the reactive component current (or respective power) may be calculated according to a magnitude of a voltage, a magnitude of current, a phase angle of current with reference to a voltage, each with regard to the motor 170, etc. In addition, the reactive component current to additionally injected may be supplied from active power.

In operation 303, when it is determined that the control of a regenerative voltage at maximum current is not needed, the control unit 150 maintains or reduces the reactive component current, and performs the regenerative voltage control only with the active component current (operation 305).

Meanwhile, according to an embodiment, even when the control of the regenerative voltage is performed by additionally injecting reactive component control in operation 304, when a certain time elapses, the reactive component current is gradually reduced and the regenerative voltage control is performed with active component current (operation 305). In this case, after the certain time elapses, when a motor speed is detected and the detected motor speed is equal to or less than a reference speed, performance of operations may be limited to operation 305.

The control of the regenerative voltage according to operation 305 may be performed repeatedly until a motor stop is detected.

Figure 4A:
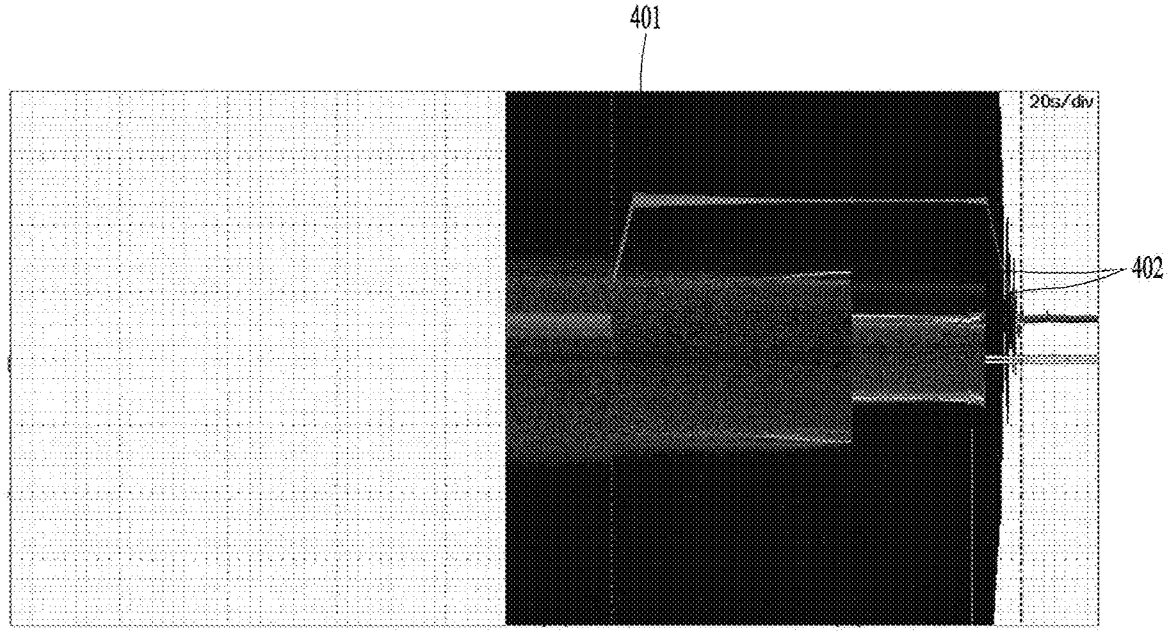
FIGS. 4A and 4B are waveform graphs for explaining performance of braking control by maintaining or additionally injecting reactive current according to an embodiment of this disclosure.
Figure 4B:
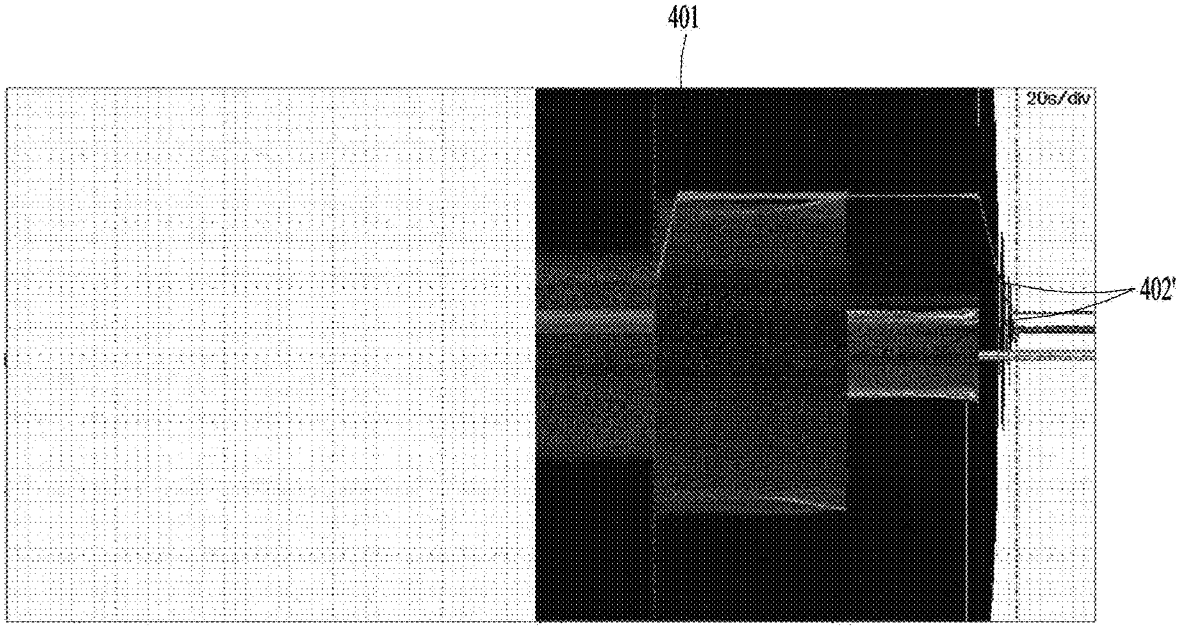

FIGS. 4A and 4B are waveform graphs for explaining performance of braking control by maintaining or additionally injecting reactive component current according to an embodiment of this disclosure.

In detail, for example, FIG. 4A shows a waveform graph in a case when braking control is performed by maintaining reactive current during a high-speed operation such as dehydration among strokes of a washing machine. In addition, FIG. 4B shows a waveform graph in a case when braking control is performed by additionally injecting reactive current to be customized to a specification of a motor/inverter during a high-speed operation such as dehydration among strokes of a washing machine.

During the braking operation, the control unit 150 drives the inverter 160 by switching to control of a DC-link voltage, i.e., control of a regenerative voltage instead of speed control. During the regenerative voltage control, the control unit 150 performs, as the regenerative operation described above, a regenerative voltage controlled braking method of consuming kinetic energy of the motor 170 and a load connected to the motor 170 (e.g., a drum in a washing machine) (as heat energy) through DC-link control of the inverter 160.

The control unit 150 performs the regenerative operation by using a method of controlling active component current according to the control of the DC-link voltage of the inverter 160. In this case, during the control of regenerative voltage at maximum current, braking performance may be enhanced by controlling maximum current by additionally injecting reactive component current in correspondence with a specification such as a capacity of the motor 170 or the inverter 160, etc.

In FIGS. 4A and 4B, it is assumed that a regenerative voltage 401 is maintained at a voltage level of about 850 V.

When the regenerative voltage 401 is assumed as a voltage of 850 V, braking time of about 76 seconds is needed in a case of FIG. 4A, and braking time of about 66 second is needed in a case of FIG. 4B. In other words, as illustrated in FIG. 4B, when regenerative voltage control is performed by additionally injecting reactive component current 402', it may be understood that braking time is reduced, and thus, braking performance is enhanced.

Meanwhile, FIG. 4A may be applied to such a case that when a load stops in an intermediate speed section, reactive component current 402 is maintained or reduced, and regenerative voltage control is performed by controlling active component current. Alternatively, after a regenerative voltage at maximum current is controlled as illustrated in FIG. 4B, and then, a certain time elapses or a motor speed is reduced to a certain value/level after a time elapses, the regenerative voltage control as illustrated in FIG. 4A may be performed.

In this disclosure, even when a control problem occurs during the regenerative voltage control described above, i.e., even when the regenerative voltage control fails, switching for regeneration may be kept being performed. Hereinafter, switching and control operations according to presence of regenerative resistance when a control problem occurs during the regenerative voltage control are described in detail.

Figure 5:
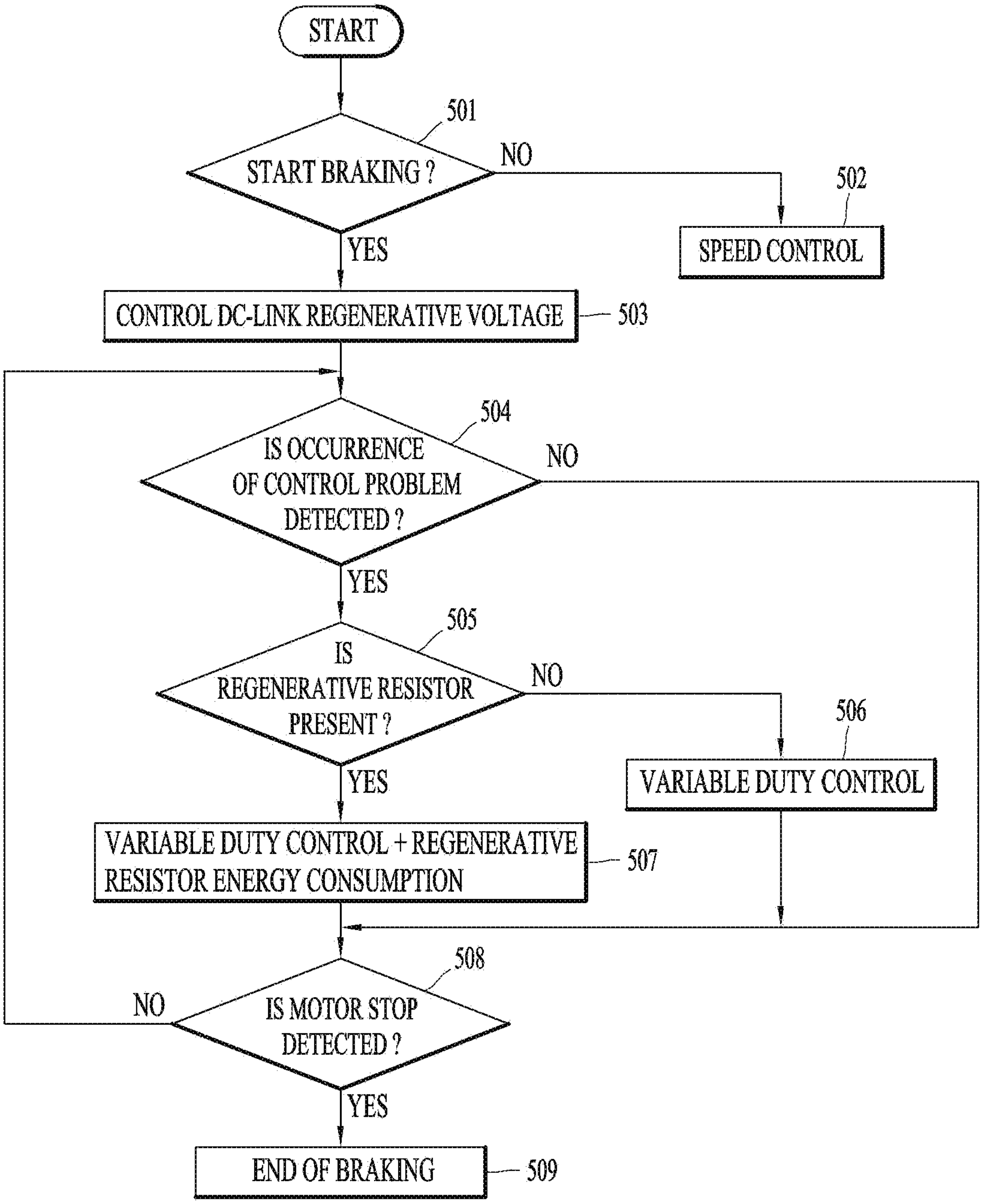
FIG. 5 is a flowchart for explaining a braking control method performed by a motor driving device according to an embodiment of this disclosure.

In relation to this, FIG. 5 shows a flowchart for explaining a braking control method performed by motor driving device according to an embodiment of this disclosure, i.e., a braking control method including occurrence of a control problem during the regenerative voltage control. It is assumed that each operation shown in FIG. 5 is performed by a control unit included in the motor drive device, unless otherwise described.

Referring to FIG. 5, it is determined whether a start command for braking is generated (501). For example, like a case when a door of a washing machine is opened while a dehydration stroke is performed (i.e., during a high-speed operation), when a condition in which a sudden stop of the washing machine is needed is satisfied, the control unit 150 (of FIG. 1) may determine that a start command for a braking operation (or generative braking) is generated.

If it is determined that the start command for the braking operation is not generated, the motor driving device is driven according to a speed control (502). On the other hand, when it is determined the start command for the braking operation is generated, DC-link regenerative voltage controlled braking is performed (503).

In detail, when the start command for braking performed, the control unit 150 detects a rotation speed of the motor 170 and compares the detected rotation speed with a value of a reference speed. When the detected rotation speed is equal to or greater than the reference speed, the control unit 150 turns the lower switches S4, S5, and S6 of the inverter 160 full on, and turn the upper switches S1, S2, and S3 full off.

Then, when a certain time elapses, a duty ratio of the lower switches S4, S5, and S6 of the inverter 160 may be gradually (e.g., linearly) increased to perform the regenerative voltage control. In some embodiments, before the regenerative voltage control described above is performed, 'force braking' of turning the upper switches S1, S2, and S3 and the lower switches S4, S5, and S6 of the inverter 160 all full off may be performed, and then, with respect to switching of the lower switches S4, S5, and S6 from a full-off state to a full-on state, 'intermediate braking' of gradually increasing a duty ratio of the lower switches S4, S5, and S6 may be further performed.

In addition, when the regenerative voltage control described above is performed, the control unit 150 may perform control of a regenerative voltage at maximum current to enhance braking performance. In detail, to perform the control of a regenerative voltage at maximum current, the regenerative voltage control is performed by additionally injecting reactive component current to active component current, and after a certain time elapses or when a motor speed is reduced to a certain level, the reactive component current is reduced and the regenerative voltage control is performed with the active component current.

While the regenerative voltage controlled braking is performed as described above, the control unit 150 may detect whether a control problem occurs (operation 504).

When the occurrence of the control problem is detected, a switching method may be selectively performed according to whether the motor driving device includes a regenerative resistor (operation 505).

In detail, as a result of determining whether a regenerative resistor is present in operation 505, when it is detected that a regenerative resistor is not present, the control unit 150 (or processor/controller) of the motor driving device performs pulse-width modulation (PWM) variable duty control (506).

In detail, the control unit 150 may output, for example, an inverter control signal for controlling a three-level inverter to the inverter 160. Here, the inverter control signal may be a pulse width modulation (PWM) control signal.

The PWM control signal may include a control signal for adjusting a duty ratio of the upper and lower switches S1 to S6 included in the inverter 160. A duty ratio generally means an on-duty ratio, which is a ratio of a time for which a switch is on to a certain time interval. That is, a maximum value of the duty ratio is 100%, and a minimum value of the duty ratio is 0%. In this case, setting of the duty ratio of a switch to the maximum value is defined as a full-on mode of the switch, and setting of the duty ratio of a switch to the minimum value is defined as a full-off mode of the switch.

With respect to the upper and lower switches S1 to S6, time for which a switch is maintained in an on state and time for which a switch is maintained in an off state during one cycle of the switch may be changed according to a value of a duty ratio of the switch set by the control unit 150. In this case, during one cycle of the upper and lower switches S1 to S6, a state in which the upper and lower switches S1 to S6 are maintained in an on state is defined as a full-on state. In addition, during one cycle of the upper and lower switches S1 to S6, a state in which the upper and lower switches S1 to S6 are maintained in an off state is defined as a full-off state.

In some embodiments, the control unit 150 may detect occurrence of a braking control problem while the regenerative operation described above is being performed. In response to the detection of the occurrence of the braking control problem, the control unit 150 may perform variable duty control of simultaneously turning a plurality of lower switches on/off at a certain time interval so that a voltage at the DC link capacitor is constant.

When it is detected that a regenerative resistor is present according to the determining in operation 505, the control unit 150 further performs an operation for consuming regenerative resistance energy together with the variable duty control, i.e., a chopper operation according to the regenerative resistor (507).

The chopper operation may be performed through the regenerative resistor and chopper circuit 140 according to a control command by the control unit 150 as illustrated in FIG. 1. The chopper operation consumes energy regenerated by the motor 170 during braking as heat energy using the regenerative resistor.

The chopper operation generates periodic pulse heat by regulating a signal (e.g., turning a switch on/off, chopping, gating, etc.) in the chopper circuit.

Since regenerative energy is distributed to the regenerative resistor and the DC link capacitor 130 according to the chopping operation, overvoltage due to regenerative energy transmitted to the DC link capacitor 130 may be prevented in advance.

The chopper operation may be performed at a certain time interval. In detail, the control unit 150 (of FIG. 1) may control to perform a chopper operation at a certain time interval (e.g., in every 10 second) using the regenerative resistor so that a part of the regenerative energy is transmitted to the regenerative resistor.

One chopper operation may consume heat energy of, for example, about 10 joules (J). In addition, the chopper operation may consume, for example, a current of 900 V/Ahm=Limit 3A as heat energy according to ohm's law.

In addition, in some embodiments, a condition for starting a chopper operation by the regenerative resistor may be imposed. For example. whether or not to start a chopper operation according to the regenerative resistor may be determined based on a rotation speed of the motor 170, an amount of current flowing through the DC link capacitor 130 (e.g., overcurrent equal to or greater than threshold current) or a magnitude of a voltage during braking. That is, even when regenerative energy is transmitted only to the DC link capacitor 130, when there is no concern about overcurrent, a chopper operation may not be started.

In this case, a regenerative resistor between the inverter and the DC link capacitor may be a small-capacity resistor. In other words, even when an appliance to which the motor driving device according to this disclosure has a large-capacity specification (e.g., a commercial washing machine), there is no need to include a large-capacity resistor and/or chopper circuit that requires an increase in cost and size for regenerative braking.

Then, the control unit 150 detects generation of a motor stop signal (508), and when the motor stop signal is detected, finishes the braking (509). Otherwise, the control unit 150 returns to operation (504) for detecting occurrence of a control problem.

In addition, the control unit 150 may maintain the variable duty control, or the variable duty control and the chopper operation, each described above, until the motor 170 stops.

Hereafter, FIGS. 6, 7, 8A, and 8B are waveform graphs for explaining braking control methods according to situations, respectively, with regard to the braking control method described with reference to the flowchart of FIG. 5.

Figure 6:
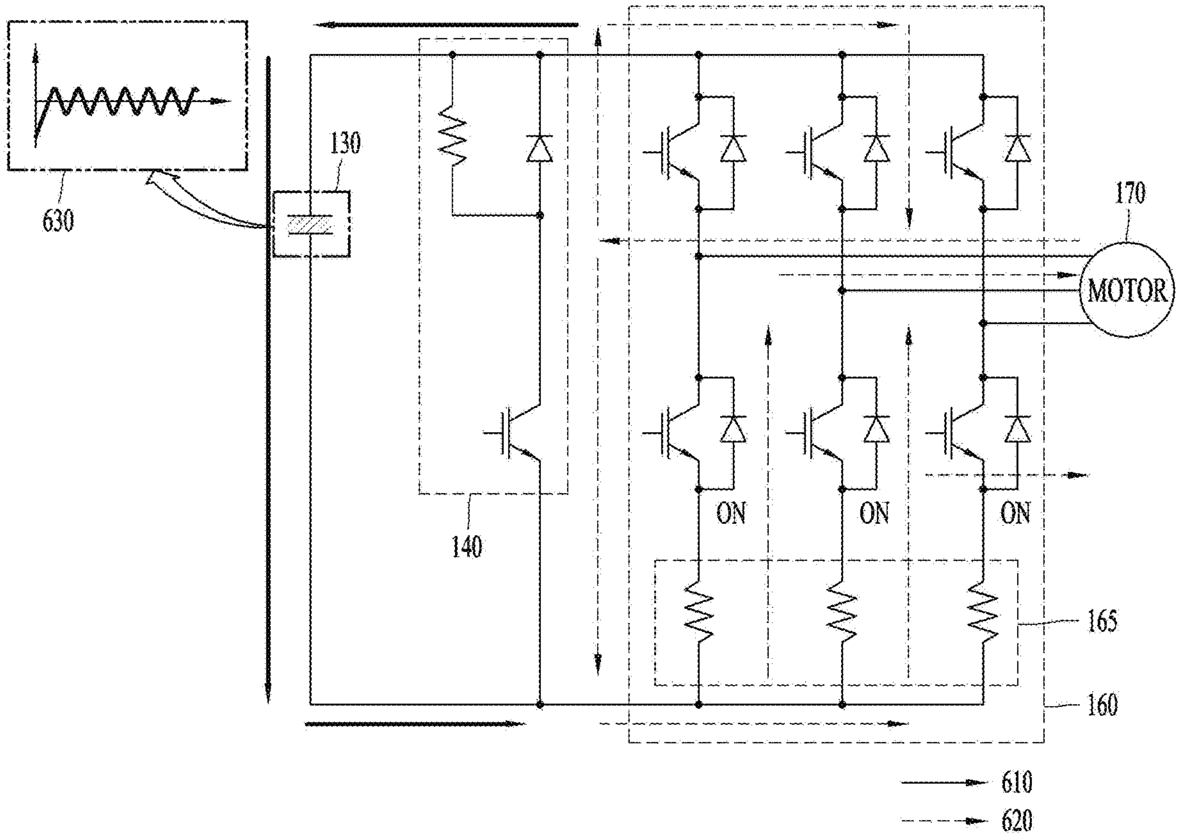
FIGS. 6, 7, 8A, and 8B are waveform graphs for explaining braking control methods according to situations, respectively, with regard to the braking control method illustrated in the flowchart of FIG. 5.

Referring to FIG. 6, according to regenerative voltage control, driving force of the motor 170 is converted into regenerative energy according to a regenerative voltage control of the inverter 160, and then, transmitted to the DC link capacitor 130. In this case, a flow, in the inverter 160, of an inner circulation 610 for the motor 170 according to kinetic energy of the motor 170 (or a load connected to the motor 170) is illustrated.

As illustrated in the drawing, the inner circulation 610 for the motor 170 is performed in such a method that current (power) corresponding to the kinetic energy transmitted from the motor 170 circulates inside according to switching operations of upper and lower switches of the inverter 160 to be transmitted to the motor 170, In this case, regenerative energy converted from the kinetic energy, i.e., energy for a DC link regenerative circulation 620 is consumed to be transmitted to the DC link capacitor 130 (selectively, the regenerative resistor and chopper circuit 140). In this case, heat energy transmitted to the DC link capacitor 130 is controlled to maintain a certain value (level) as illustrated in a graph 630.

Figure 7:
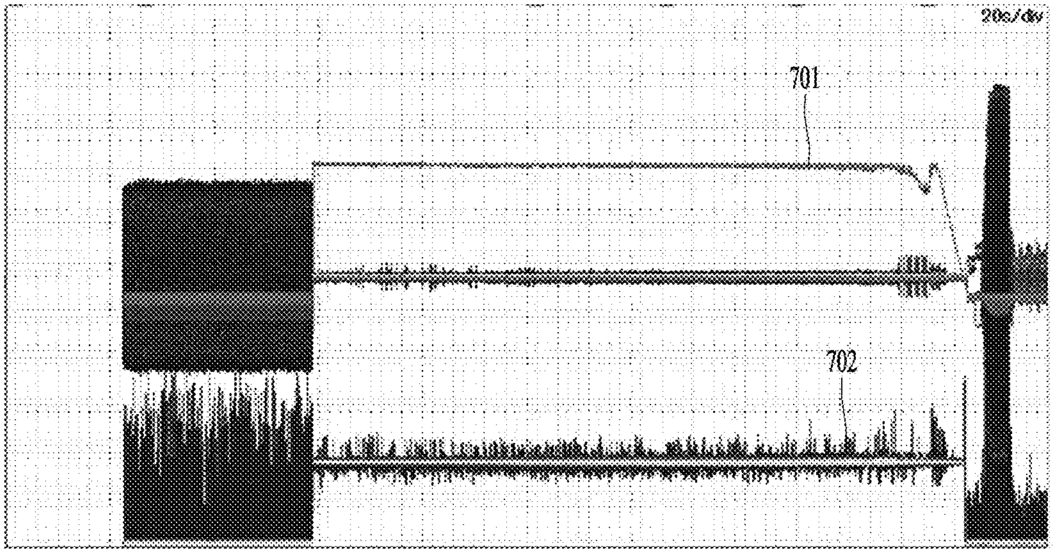

FIG. 7 shows a result of performing variable duty control when the motor driving device does not include a regenerative resistor (and a chopper circuit).

When a control problem occurs during braking control, the control unit 150 performs variable duty control after PWM is off for a certain time. The variable duty control is to vary a duty to maintain DC-link voltage 701 and current 702 to be constant by simultaneously performing on/off control on three lower switches of the inverter 160. When only the DC-link voltage 701 can be sensed, driving may be performed without a control unit. Thus, even when a control problem occurs, braking control and detection of a motor stop may be stably performed.

Figure 8A:
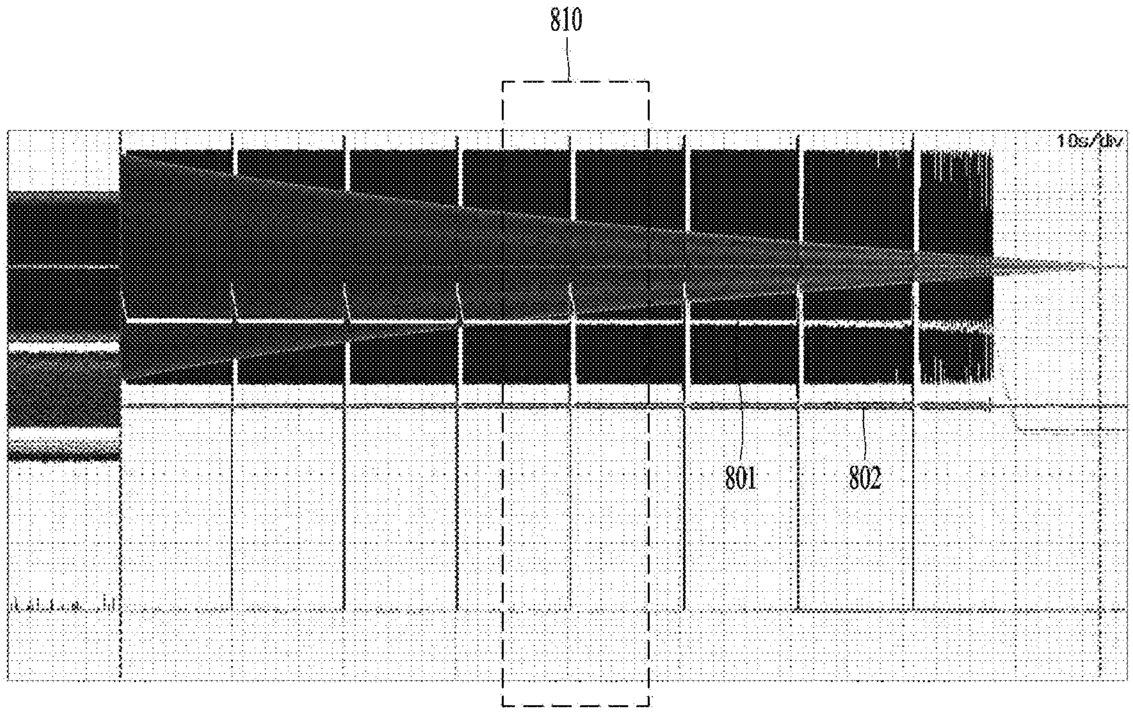
Figure 8B:
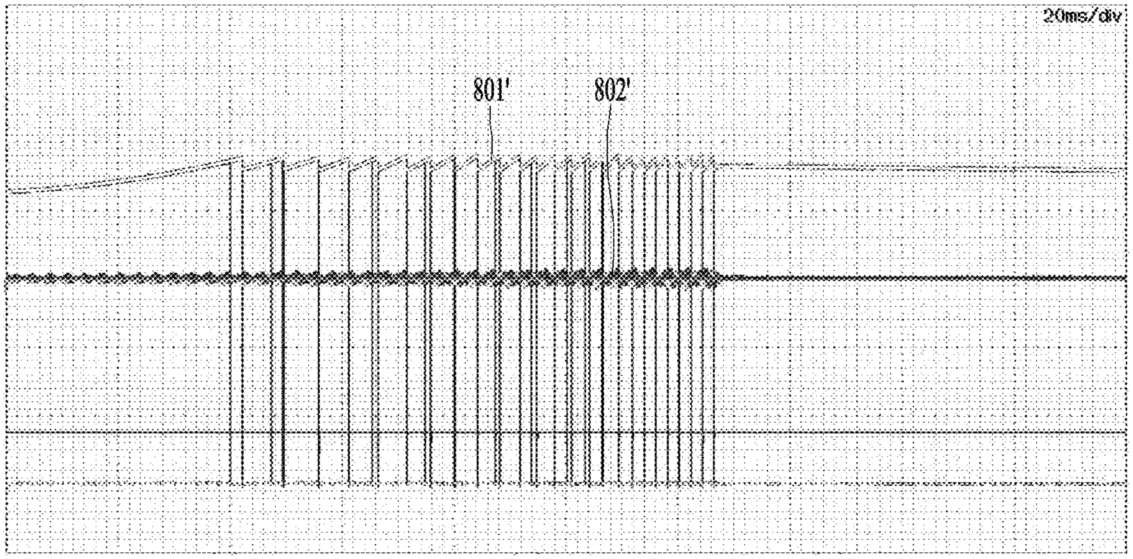

FIGS. 8A and 8B show a result of performing a chopper operation together with variable duty control when a motor driving device includes a regenerative resistor (and chopper circuit).

The inverter 160 may be connected to a small-capacity regenerative resistor to constitute the motor driving device. For example, a capacitor-less inverter may be included together with a small-capacity regenerative resistor. In this case, the regenerative resistor is generally configured to operate in hardware on its own when a DC-link voltage increases to a certain value (level) due to great energy regenerated to a DC link.

When a small-capacity regenerative (braking) resistor is included in the inverter 160 configured to be driven when a control problem occurs during braking, additional regenerative energy consumption may be performed. In detail, in a situation when a DC link voltage is maintained through variable duty control by the control unit 150, when a voltage is increased to a level equal to or greater than a level of a DC link chopper operation of the inverter 160, a chopper circuit is driven to consume heat energy with a small-capacity regenerative resistor.

FIG. 8B is an enlarged view of a partial section 810 of FIG. 8A. As illustrated in FIGS. 8A and 8B, when a regenerative resistor (and a chopper circuit) is included, it may be checked that chopper operations 801 and 801' are performed at an interval of about 10 seconds to generate heat energy of 20 J. Accordingly, it may be understood that certain values (levels) of voltages 802 and 802' may be maintained even when a braking control problem occurs.

As such, according to at least one of embodiments of this disclosure, when braking occurs during a high-speed operation of a motor, a damage to an inverter which may be caused by occurrence of overcurrent may be prevented, and motor demagnetization and noise generation may be effectively minimized. In addition, upon occurrence of braking during a high-speed operation of a motor, regenerative voltage control may be performed by additionally injecting reactive component current to thereby reduce braking time. Further, when occurrence of a control problem is detected while regenerative voltage control is performed, variable duty control of simultaneously turning lower switches of an inverter on/off may be performed, and when a regenerative resistor is present, a chopper operation may be performed through the regenerative resistor together with the variable duty control to thereby quickly and stably perform consumption of regenerative energy.

Further scope of applicability of the present disclosure will become apparent from the detailed description. It should be understood, however, that the detailed description and specific examples, such as the preferred embodiment of the disclosure, are given by way of illustration only, since various changes and modifications within the spirit and scope of the disclosure will be apparent to those skilled in the art.

The features, structures, effects, etc. described above in the embodiments are included in at least one embodiment of the present disclosure, but are not limited to only one embodiment. Further, the features, structures, effects, etc. described in the embodiments may also be combined or modified with respect to other embodiments by those of ordinary skill in the art to which the embodiments pertain. Accordingly, the description relevant such combinations and modifications should be interpreted as being included in the scope of the present disclosure.

In addition, the foregoing description has been made with reference to the embodiments, but it is merely illustrative and is not intended to limit the present disclosure. It will be apparent that other changes and applications can be made by those skilled in the art to which the present disclosure belong without departing from substantial features of the embodiments of the present disclosure. For example, each component specifically shown in the embodiments can be modified and implemented. In addition, differences relevant to such modifications and applications will be construed as being included in the scope of the present disclosure as defined by the appended claims.

What is claimed is:

1. A motor driving device comprising:

a direct current (DC) link capacitor configured to store DC power;

an inverter comprising a plurality of upper switches and a plurality of lower switches, the inverter being configured to convert the DC power stored in the DC link capacitor into AC power and supply the AC power to a motor;

a shunt resistor connected to the plurality of lower switches, the shunt resistor being configured to sense current flowing through the inverter and detect whether the current has reached threshold current to control a regenerative voltage during a braking operation; and a control unit configured to control an operation of the inverter and perform a regenerative operation based on the braking operation starting, wherein the control unit is configured to, during the regenerative operation, control the inverter and the motor to switch motive power of a drum connected to the motor into regenerative energy and transmit the regenerative energy to the DC link capacitor, by controlling active component current and reactive component current together based on the threshold current being reached, and wherein the control unit is configured to perform:

a first regenerative operation of transmitting first regenerative energy to the DC link capacitor, the first regenerative energy being generated by additionally injecting the reactive component current based on the threshold current being reached, and a second regenerative operation of transmitting second regenerative energy to the DC link capacitor, the second regenerative energy being generated by maintaining or reducing the reactive component current based on the current being less than the threshold current.

2. The motor driving device of claim 1, wherein the control unit is configured to perform the regenerative operation by starting the braking operation based on a stopping occurrence during a high-speed operation of the drum.

3. The motor driving device of claim 1, wherein the control unit is configured to, based on occurrence of a braking control problem during the regenerative operation, perform variable duty control of turning the plurality of lower switches at intervals to maintain a voltage of the DC link capacitor to be constant.

4. The motor driving device of claim 3, further comprising a small-capacity regenerative resistor having a first end being connected to the inverter and a second end being connected to the DC link capacitor.

5. The motor driving device of claim 4, wherein the control unit is configured to, based on the occurrence of the braking control problem during the regenerative operation, additionally perform a chopper operation using the small-capacity regenerative resistor based on the variable duty control.

6. The motor driving device of claim 5, wherein the variable duty control is maintained until the motor stops.

7. The motor driving device of claim 5, wherein the variable duty control and the chopper operation are maintained until the motor stops.

8. A braking control method performed by a motor driving device, the motor driving device comprising:

a direct current (DC) link capacitor configured to store DC power;

an inverter comprising a plurality of upper switches and a plurality of lower switches, the inverter being configured to convert the DC power stored in the DC link capacitor into AC power and supply the AC power to a motor;

a shunt resistor connected to the plurality of lower switches, the shunt resistor being configured to sense current flowing through the inverter and detect whether the current has reached threshold current to control a regenerative voltage during a braking operation; and a control unit, the braking control method comprising:

generating a control command for starting generative braking to stop the motor, detecting, via the shunt resistor, that the current flowing through the inverter reaches the threshold current, performing a regenerative operation of switching motive power of a drum connected to the motor into regenerative energy by controlling active component current and reactive component current together based on the threshold current being reached, and transmitting the regenerative energy to DC link capacitor, wherein performing the regenerative operation comprises:

performing a first regenerative operation of transmitting first regenerative energy to the DC link capacitor, the regenerative energy being generated by additionally injecting the reactive component current based on the threshold current being reached, and performing a second regenerative operation of transmitting second regenerative energy to the DC link capacitor, the regenerative energy being generated by maintaining or reducing the reactive component current generated based on the current being less than the threshold current.

9. The braking control method of claim 8, wherein starting the generative braking is performed based on a stopping occurrence during a high-speed operation with respect to a load connected to the motor.

10. The braking control method of claim 9, wherein the load includes the drum.

11. The braking control method of claim 8, further comprising:

detecting occurrence of a braking control problem during the regenerative operation; and performing variable duty control of simultaneously turning the plurality of lower switches on or off at intervals to maintain a voltage of the DC link capacitor to be constant.

12. The braking control method of claim 11, further comprising:

additionally performing, during the variable duty control, a chopper operation using a small-capacity regenerative resistor having a first end connected to the inverter and a second end connected to the DC link capacitor.

13. The braking control method of claim 12, further comprising:

continuously performing the variable duty control and the chopper operation until the motor stops.

14. A motor system comprising:

a motor;

a drum connected to the motor;

a direct current (DC) link capacitor configured to store DC power;

an inverter configured to convert the DC power into AC power and supply the AC power to the motor;

a shunt resistor configured to detect whether current through the inverter has reached a threshold value to control a regenerative voltage during a braking operation; and a control unit configured to control the inverter and perform a regenerative operation based on the braking operation, wherein the control unit is configured to, during the regenerative operation, switch motive power of the drum into regenerative energy and transmit the regenerative energy to the DC link capacitor by controlling active component current and reactive component current together based on the current reaching the threshold value, and wherein the control unit is configured to:

transmit first regenerative energy to the DC link capacitor, the first regenerative energy being generated by additionally injecting the reactive component current based on the current reaching the threshold value, and transmit second regenerative energy to the DC link capacitor, the second regenerative energy being generated by maintaining or reducing the reactive component current based on the current being less than the threshold value.

15. The motor system of claim 14, wherein the control unit is configured to perform the regenerative operation by starting the braking operation based on a stopping occurrence during a high-speed operation of the drum.

16. The motor system of claim 14, wherein the control unit is configured to, based on occurrence of a braking control problem during the regenerative operation, perform variable duty control of turning a plurality of lower switches of the inverter at intervals to maintain a voltage of the DC link capacitor to be constant.

17. The motor system of claim 16, further comprising a small-capacity regenerative resistor having a first end being connected to the inverter and a second end being connected to the DC link capacitor.

* * * * *